US012636941B2

(12) United States Patent
He

(10) Patent No.: US 12,636,941 B2
(45) Date of Patent: May 26, 2026

(54) IN-VEHICLE SUNSHADE UMBRELLA

(71) Applicant: Dongyu He, Shenzhen (CN)

(72) Inventor: Dongyu He, Shenzhen (CN)

( * ) Notice: Subject to any disclaimer, the term of this patent is extended or adjusted under 35 U.S.C. 154(b) by 0 days.

(21) Appl. No.: 19/269,345

(22) Filed: Jul. 15, 2025

(65) Prior Publication Data

US 2026/0084499 A1 Mar. 26, 2026

Related U.S. Application Data

(63) Continuation-in-part of application No. 19/032,852, filed on Jan. 21, 2025.

(30) Foreign Application Priority Data

Sep. 23, 2024 (CN) .......................... 202422333295.6

(51) Int. Cl.
*B60J 1/20* (2006.01)

(52) U.S. Cl.
CPC .................................... *B60J 1/2091* (2013.01)

(58) Field of Classification Search
CPC ........ B60J 1/2011; B60J 1/2091; B60J 11/08; B60J 1/20; A45B 23/00; A45B 25/08; A45B 25/02
See application file for complete search history.

(56) References Cited

U.S. PATENT DOCUMENTS

| | | | | |
|---|---|---|---|---|
| 4,711,260 A | * | 12/1987 | Wiens | .................... A45B 23/00 473/195 |
| 4,784,215 A | * | 11/1988 | Sing | ....................... B60J 1/2091 165/47 |

| | | | | |
|---|---|---|---|---|
| 6,561,257 B2 | * | 5/2003 | Huang | ................... B60J 1/2091 160/134 |
| 6,762,582 B2 | * | 7/2004 | Kirkpatrick | ............. H02S 10/40 320/101 |
| 7,252,106 B2 | * | 8/2007 | Conforti | ................ B60J 1/2091 135/117 |
| 9,326,573 B1 | * | 5/2016 | Harris | .................... A45B 11/00 |
| 9,643,476 B2 | * | 5/2017 | Lenterman | ............. B60J 1/2091 |
| 9,821,637 B1 | * | 11/2017 | Robles | ............... B60H 1/00428 |
| 10,076,949 B1 | * | 9/2018 | Kenney | .................. A45B 23/00 |
| 12,187,103 B1 | * | 1/2025 | He | .......................... B60J 3/0213 |
| 2019/0217686 A1 | * | 7/2019 | Mondragón | ........... B60J 1/2091 |

FOREIGN PATENT DOCUMENTS

CN 216942626 U * 7/2022

OTHER PUBLICATIONS

CN 216942626 machine translation (Year: 2022).*

* cited by examiner

*Primary Examiner* — Abe Massad

(57) ABSTRACT

The present disclosure relates to an in-vehicle sunshade umbrella, including: an umbrella shaft; umbrella ribs connected to the umbrella shaft, wherein the umbrella ribs slide along the umbrella shaft to fold or unfold; and an umbrella canopy including a first surface and a second surface opposite to each other, wherein at least one of the first surface and the second surface is connected to the umbrella ribs, a cavity is formed between the first surface and the second surface, and the first surface and the second surface fold or unfold synchronously with the umbrella ribs. The present disclosure aims to solve the problem that a single-layer umbrella canopy structure has a limited heat insulation effect and cannot effectively block thermal radiation from sunlight, which results in a relatively high temperature inside a vehicle.

21 Claims, 13 Drawing Sheets

1

IN-VEHICLE SUNSHADE UMBRELLA

CROSS-REFERENCE TO RELATED APPLICATIONS

This application is a Continuation-in-part of the U.S. application Ser., No. 19032852 filed on Jan. 21, 2025, and entitled "IN-VEHICLE SUNSHADE", now pending, the entire disclosures of which are incorporated herein by reference.

TECHNICAL FIELD

The present disclosure relates to the technical field of sunshade umbrellas, in particular to an in-vehicle sunshade umbrella.

BACKGROUND

With the widespread use of automobiles in daily life, the problem of sunshade for vehicles in high-temperature summer environments has received increasing attention. The automotive sunshade umbrella, as a common in-vehicle sunshade device, is mainly used to block the front windshield from direct sunlight, thereby reducing the interior temperature of the vehicles and protecting the interior trim.

However, existing automotive sunshade umbrellas still have certain deficiencies in terms of structure and functionality. Most automotive sunshade umbrellas currently available on the market have a single-layer umbrella canopy structure, which offers a limited heat insulation effect and cannot effectively block thermal radiation from sunlight, resulting in a relatively high temperature inside the vehicle. Therefore, there is an urgent need for a novel automotive sunshade umbrella that optimizes an umbrella canopy structure to form a cavity between double-layer umbrella canopies, significantly improving heat insulation performance while ensuring adaptability and ease of use, thereby better meeting user demands.

SUMMARY

The present disclosure is to provide an in-vehicle sunshade umbrella to solve the problem that a single-layer umbrella canopy structure has a limited heat insulation effect and cannot effectively block thermal radiation from sunlight, which results in a relatively high temperature inside a vehicle.

To solve the above technical problems, the present disclosure adopts the following technical solution:

An in-vehicle sunshade umbrella comprises:

an umbrella shaft;

umbrella ribs connected to the umbrella shaft, wherein the umbrella ribs slide along the umbrella shaft to fold or unfold; and an umbrella canopy comprising a first surface and a second surface opposite to each other, wherein at least one of the first surface and the second surface is connected to the umbrella ribs, a cavity is formed between the first surface and the second surface, and the first surface and the second surface are folded or unfolded synchronously with the umbrella ribs.

It can be seen from the above technical solutions that the embodiments of the present disclosure have at least the following advantages and positive effects:

In the in-vehicle sunshade umbrella of the embodiments of the present disclosure, the umbrella canopy comprises a first surface and a second surface that are opposite to each other, and a cavity is formed between the first surface and the second surface. The double-layer canopy further blocks solar heat from entering the interior of the vehicle. Air in the cavity between the first and second surfaces remains relatively still, thereby resulting in a low thermal conductivity coefficient, which can effectively prevent heat from being further transferred to the vehicle interior. Additionally, the cavity slows down the direct heat transfer between the canopy surfaces, avoiding local high temperatures.

DESCRIPTION OF THE DRAWINGS

In order to explain the embodiments of the present disclosure or the technical solutions in the prior art more clearly, the accompanying drawings required by the embodiments or descriptions in the prior art are introduced briefly below. Obviously, the accompanying drawings in the description below are merely embodiments of the present disclosure, and those of ordinary skill in the art can also obtain other accompanying drawings based on the structures illustrated in these accompanying drawings without creative work.

Figure 1:
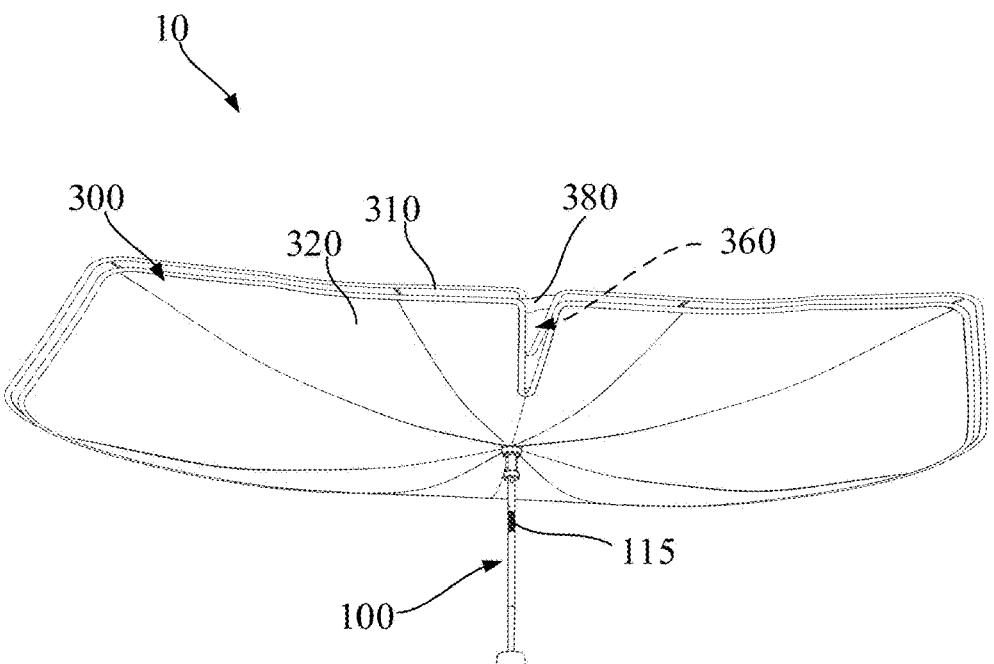
FIG. 1 is a schematic view of an overall structure of an in-vehicle sunshade umbrella according to a first embodiment of the present disclosure.

10. In-vehicle sunshade umbrella;
100. umbrella shaft;
110. Shaft body
111. Mounting end;
112. Handle end;
113. First telescopic rod;
114. Second telescopic rod;
115. Bending member;
115*a*. Flexible tube;
115*b*. Hinge shaft;
116. Stop block;
116*a*. Inclined surface;
120. Handle;
121. Through hole;
130. Locking structure;
131. Locking portion;
131*a*. Locking tab;
131*b*. Locking hole;
132. Push-pull portion;
200. Umbrella rib;
210. Elastic member;
220. Long rib;
221. First long rod;
222. Second long rod;
223. Third long rod;
224. Fourth long rod;
225. Long tension member;
230. Short rib;
231. First short rod;
232. Second short rod;
233. Third short rod;
234. Short tension member;
300. Umbrella canopy;
310. First surface;
320. Second surface;
330. Cavity;
340. Supporting member;
341. Supporting hole;
350. Patch;
360. Clearance notch;
370. Closing member;
380. Tie strap;
390. Heat dissipation notch;
400. Solar panel;
500. Heat dissipation member;
600. Housing;
610. Air duct.

DETAILED DESCRIPTION OF EMBODIMENTS

Typical embodiments embodying the features and advantages of the present disclosure will be described in detail in the following description. It is to be understood that the present disclosure is capable of having various variations in different embodiments without departing from the scope of the present disclosure, and that the descriptions and drawings therein are intended to be illustrative in nature and are not intended to limit the present disclosure.

Moreover, the terms "first" and "second" are used for descriptive purposes only and are not to be construed as indicating or implying relative importance or implicitly indicating the number of the technical features indicated. Thus, the features defined as "first" or "second" may explicitly or implicitly comprise one or more of the features. In the description of the present disclosure, the meaning of "plurality" is two or more, unless otherwise clearly and specifically limited.

In the description of the present disclosure, it should be noted that unless otherwise expressly specified and limited, the terms "mount", "connect" and "attach" should be understood in a broad sense, for example, it may be fixedly connected, detachably connected, or integrally connected, may be mechanically connected or electrically connected, may be directly connected or indirectly connected by means of an intermediate medium, and may also be an internal communication between two components. The specific meanings of the above terms in the present disclosure may be understood by those of ordinary skill in the related art depending on specific circumstances.

With reference to FIG. 1 to FIG. 11, the present disclosure provides an in-vehicle sunshade umbrella 10, which is configured to be placed against a windshield inside a vehicle to reduce the interior temperature and prevent direct sunlight from irradiating a vehicle dashboard, thereby reducing damage to interior decorative components. When in use, the in-vehicle sunshade umbrella 10 is unfolded along the plane of the front windshield to block direct sunlight from entering a cab.

Figure 2:
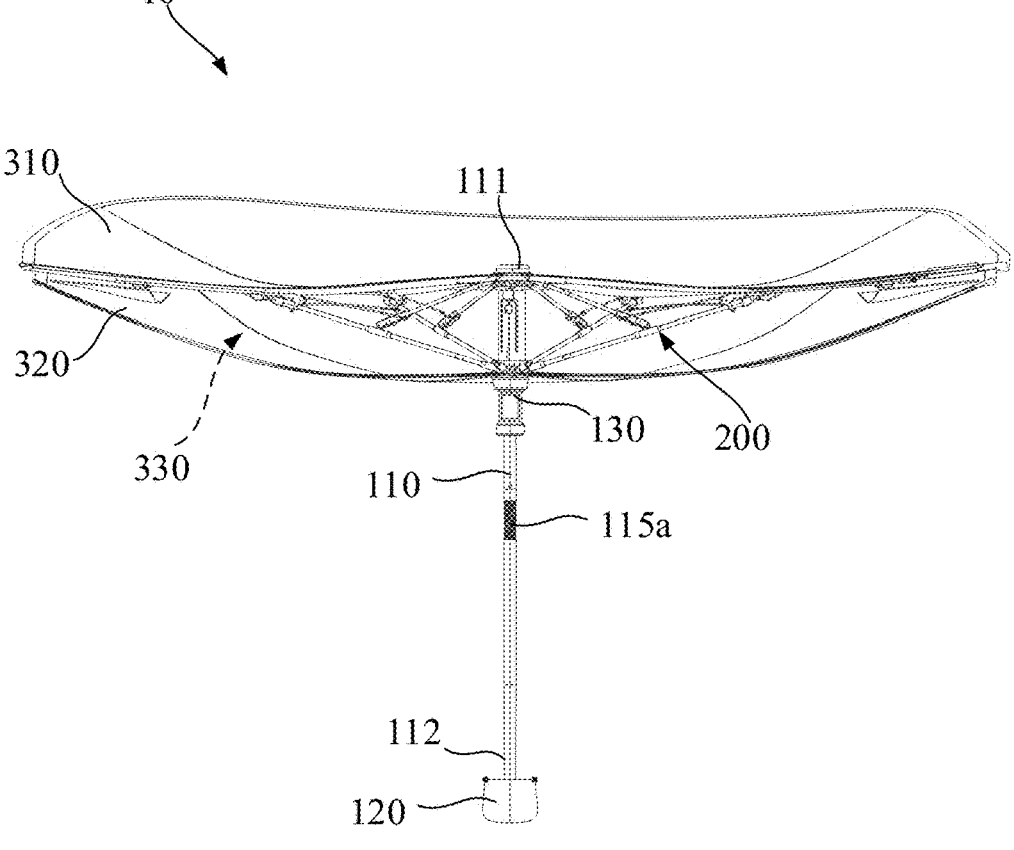
FIG. 2 is a schematic view of a cross-section structure of the in-vehicle sunshade umbrella as shown in FIG. 1.
Figures 3, 4:
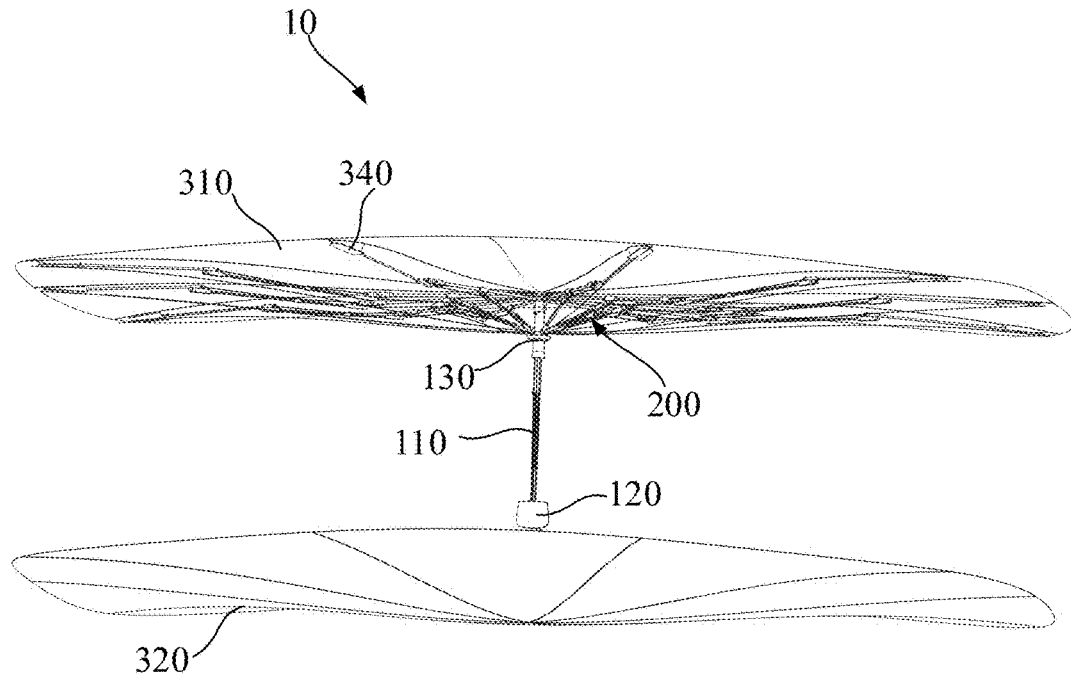
FIG. 3 is an exploded schematic structural view of the in-vehicle sunshade umbrella as shown in FIG. 1.
FIG. 4 is a schematic view of an overall structure of an in-vehicle sunshade umbrella according to a second embodiment of the present disclosure.

With reference to FIG. 1 to FIG. 3, the in-vehicle sunshade umbrella 10 includes an umbrella shaft 100, umbrella ribs 200 and an umbrella canopy 300, where the umbrella shaft 100 is connected to the umbrella ribs 200, one end of each umbrella rib 200 slides along the umbrella shaft 100 to fold or unfold; and the umbrella canopy 300 includes a first surface 310 and a second surface 320 opposite to each other, at least one of the first surface 310 and the second surface 320 is connected to the umbrella ribs 200, a cavity 330 is formed between the first surface 310 and the second surface 320, and the first surface 310 and the second surface 320 are folded or unfolded synchronously with the umbrella ribs 200, so as to achieve the unfolding and folding of the in-vehicle sunshade umbrella 10.

In the present embodiment, one end of the umbrella shaft 100 is used for user gripping, and the other end is connected to a central position of the umbrella canopy 300. When the umbrella canopy 300 is unfolded under the support of the umbrella ribs 200, the first surface 310 is placed against a vehicle windshield to block sunlight. When the umbrella ribs 200 slide along the umbrella shaft 100 for folding, the first surface 310 and the second surface 320 are folded synchronously with the umbrella ribs 200, thereby facilitating storage. Both the first surface 310 and the second surface 320 of the umbrella canopy 300 are provided with reflective heat-insulating coatings, thereby enhancing the overall sunshade and thermal insulation effect of the umbrella canopy 300. The cavity 330 between the first surface 310 and the second surface 320 further prevents heat from being directly transferred through the umbrella canopy 300 to the vehicle interior, thereby improving the heat insulation effect. Specifically, the thermal conductivity coefficient of still air is relatively low. Compared with a single-layer umbrella canopy 300, the cavity 330 effectively blocks heat transfer into the vehicle through the still air, and avoids local high temperatures on the umbrella canopy 300.

Further, the umbrella ribs 200 are sandwiched within the cavity 330 between the first surface 310 and the second surface 320. In the present embodiment, the umbrella ribs 200 are embedded in the cavity 330, thereby avoiding impact damage caused by exposure, and a hidden support structure helps maintain a neat appearance of an inner side surface of the sunshade umbrella. In addition, since vehicle interior trims are prone to being scratched or damaged by metal components, the double-layer encapsulation of the umbrella ribs 200 in the present embodiment by the first surface 310 and the second surface 320 prevents direct contact and friction between the umbrella ribs 200 and a vehicle windshield or a vehicle body, thereby protecting the vehicle body. It can be understood that a side of the first surface 310 adjacent to the second surface 320 and a side of the second surface 320 adjacent to the first surface 310 may both be connected to the umbrella ribs 200, so that the umbrella ribs 200 can synchronously drive the first surface 310 and the second surface 320 to fold and unfold during retraction.

Further, in one embodiment, an edge of the first surface 310 is fixedly connected to an edge of the second surface 320 in a non-detachable manner, so that the first surface 310 and the second surface 320 do not separate from each other after prolonged use, thereby improving the connection stability of the umbrella canopy 300. Specifically, the edge of the first surface 310 and the edge of the second surface 320 may be integrally fixedly connected by a heat-activated adhesive film, or may be fixedly connected by stitching threads. The material of the stitching threads is not limited, and may be polyester threads, aramid threads, PTFE threads, etc.

Further, in another embodiment, the umbrella canopy 300 also includes a first connecting member and a second connecting member that are detachably connected. The first connecting member is fixed to the side of the first surface 310 adjacent to the second surface 320, and the second connecting member is fixed to a side of the second surface 320 adjacent to the first surface 310. The first connecting member and the second connecting member engage or disengage with each other to enable quick connection, fixation and disassembly of the first surface 310 and the second surfaces 320, thereby facilitating maintenance of the umbrella ribs 200 within the cavity 330 and allowing users to replace the umbrella canopy 300 with different types according to user preferences. It should be noted that the first connecting member and the second connecting member may be hook and loop surfaces of a Velcro fastener, two magnetic sheets, or two snap buttons that can engage and disengage with each other.

Further, with reference to FIG. 4 to FIG. 7, a plurality of supporting members 340 are fixedly disposed on the side of the first surface 310 adjacent to the second surface 320. A supporting hole 341 is formed in each supporting member 340, and end portions of the umbrella ribs 200 are inserted into the corresponding supporting holes 341, thereby fully opening the umbrella canopy 300. In the present embodiment, the supporting members 340 are circumferentially arranged at intervals along the edge of the first surface 310. The umbrella ribs 200 include a plurality of supporting end portions. When the user unfolds the umbrella ribs 200, the end portions of the umbrella ribs 200 are unfolded to support corners of the umbrella canopy 300, so that the surface of the umbrella canopy 300 is smooth and free of creases.

Figure 5:
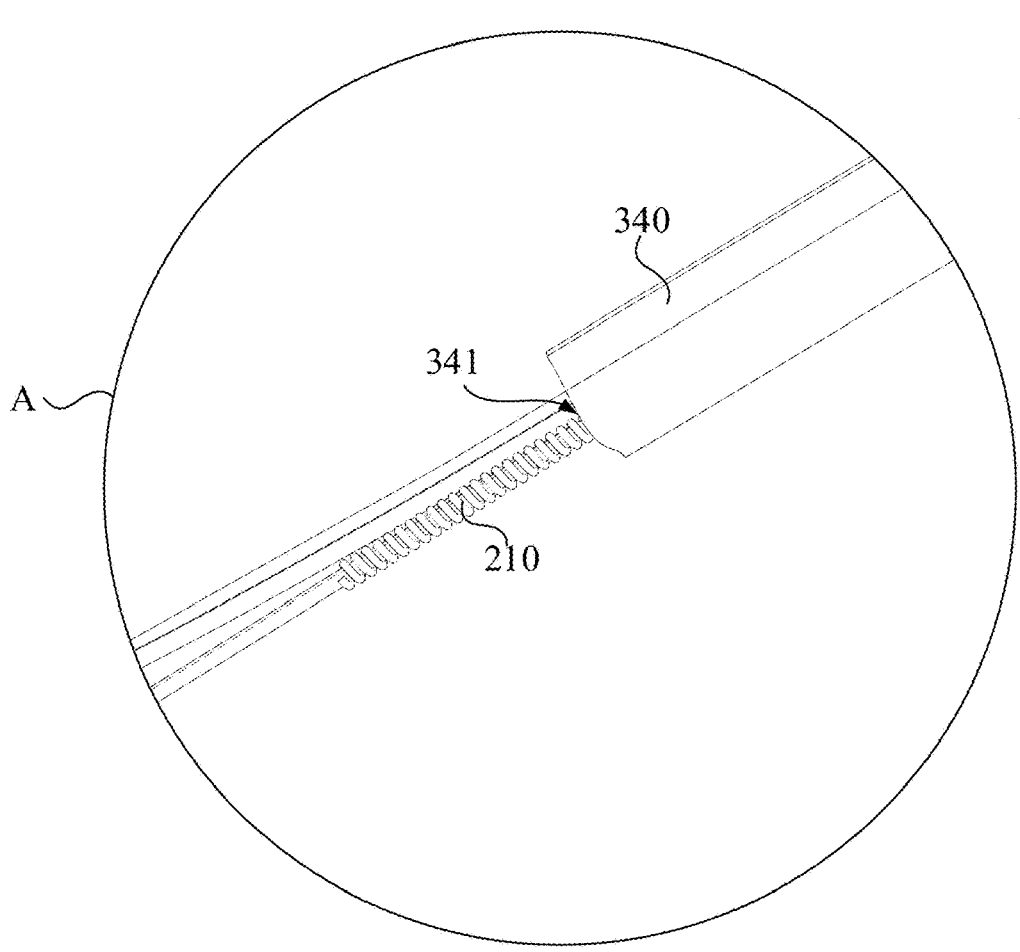
FIG. 5 is an enlarged structural view of region A in FIG. 4.

Further, with reference to FIG. 4 and FIG. 5, in one embodiment, the end portions of the umbrella ribs 200 are provided with elastic members 210 equal in number to the supporting members 340. The clastic members 210 are sleeved on the end portions of the corresponding umbrella ribs 200. One end of each clastic member 210 is fixed relative to the corresponding umbrella rib 200, and the other end of the clastic member 210 is inserted into the supporting hole 341 along with the end portion of the corresponding umbrella rib 200. Specifically, the end portions of the umbrella ribs 200 are all provided with the clastic members 210. The clastic members 210 are deformable and capable of generating an elastic force, thereby forming an elastic abutment between the end portions of the umbrella ribs 200 and the supporting members 340. It can be understood that the elastic member 210 may be a spring. The spring is sleeved on the end portion of the umbrella rib 200. When the umbrella ribs 200 are folded, the springs are compressed to deform by bottom walls of supporting holes 341. When the umbrella ribs 200 are unfolded, the springs release clastic force, thereby enabling the end portions of the umbrella ribs 200 to elastically expand the umbrella canopy 300.

Figure 6:
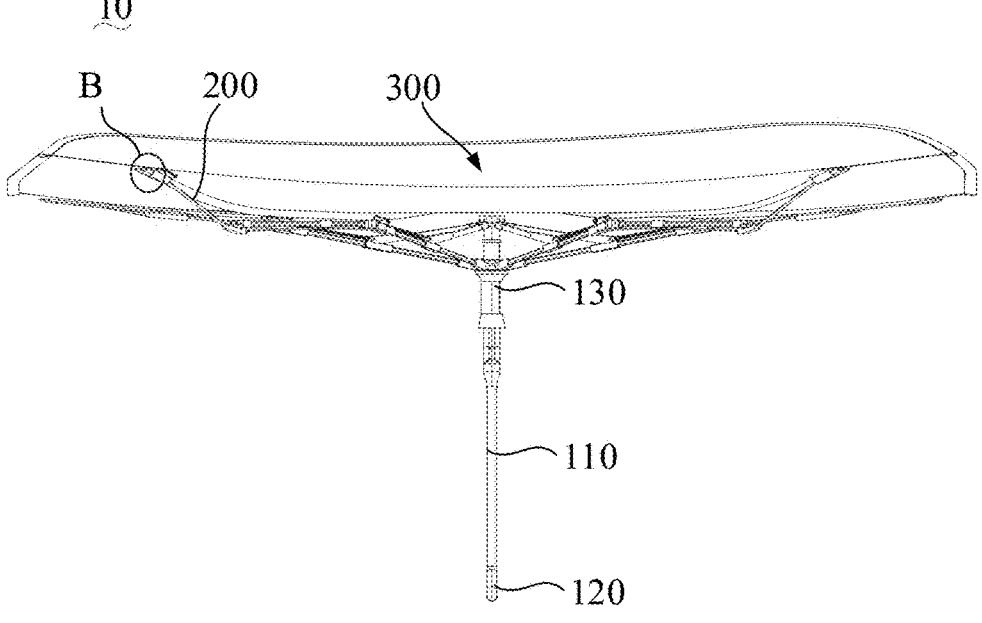
FIG. 6 is a schematic view of a cross-section structure of an in-vehicle sunshade umbrella according to a third embodiment of the present disclosure.
Figure 7:
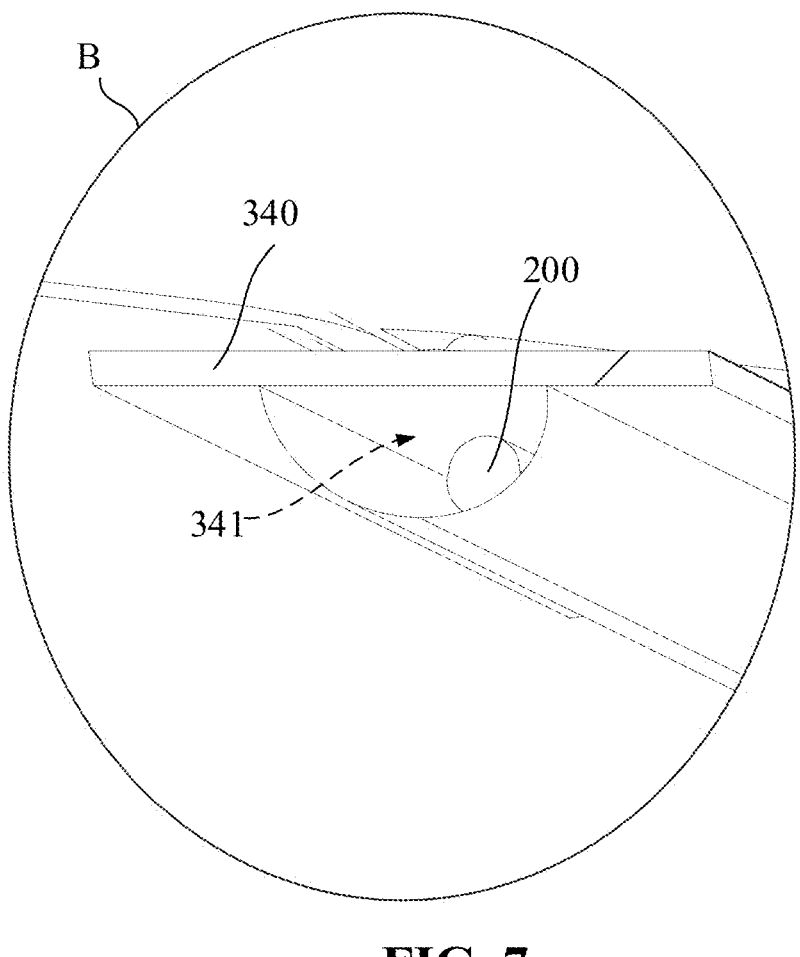
FIG. 7 is an enlarged structural view of region B in FIG. 6.

Further, with reference to FIG. 6 and FIG. 7, in one embodiment, the supporting members 340 are silicone sheets or rubber sheets, and the supporting holes 341 are formed in the supporting members 340. Specifically, the material of the supporting member 340 is deformable to generate an elastic force. When the end portions of the umbrella ribs 200 are inserted into the corresponding supporting holes 341, the bottom walls of the supporting holes 341 are compressed by the umbrella ribs 200 to produce an elastic deformation effect. The supporting members 340 may be fixed on the umbrella canopy 300 by means of stitching or adhesive bonding. When the user opens the umbrella ribs 200, the end portions of the umbrella ribs 200 press against the bottom walls of the supporting holes 341 to cause the supporting members 340 to generate elastic force, thereby elastically expanding the umbrella canopy 300 and maintaining a smooth and flat umbrella canopy 300.

Figure 8:
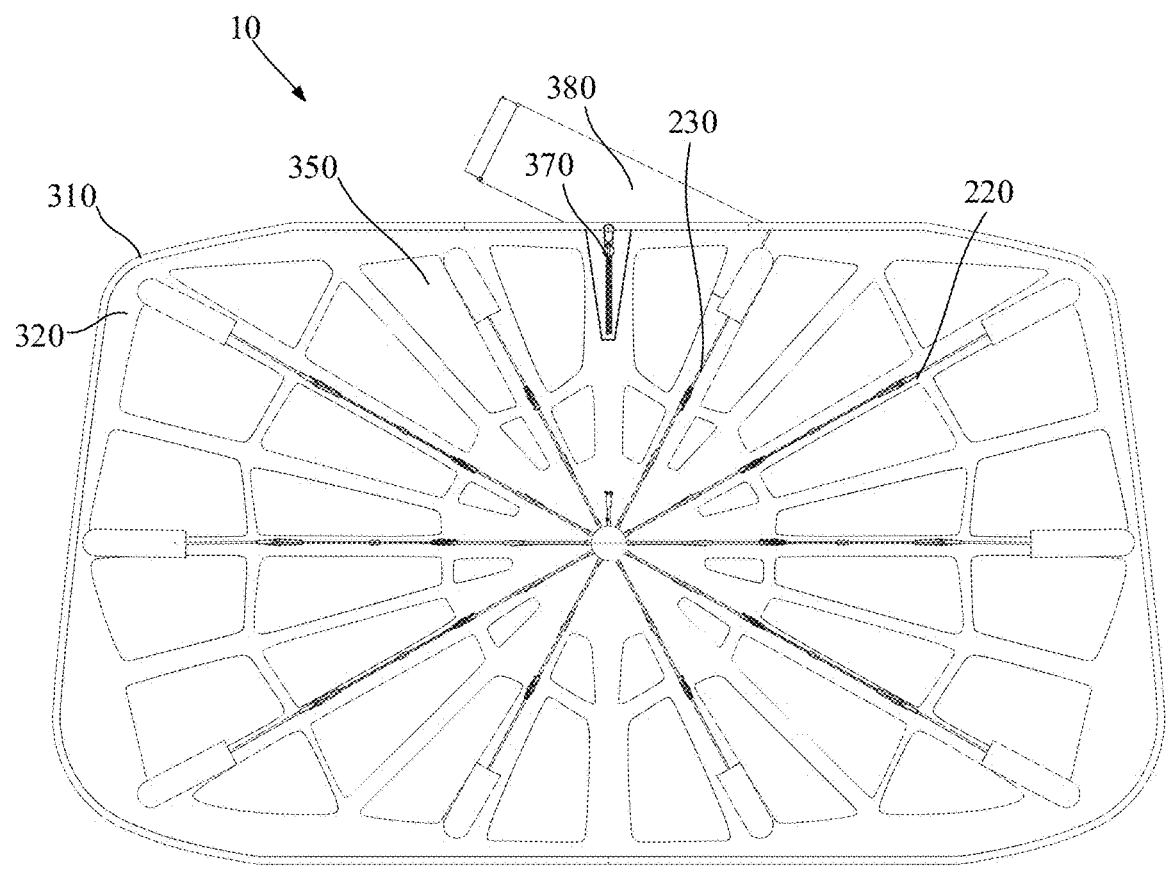
FIG. 8 is a bottom-view schematic structural view of an in-vehicle sunshade umbrella according to a fourth embodiment of the present disclosure.

Further, with reference to FIG. 8, in one embodiment, patches 350 are fixed to at least one of the first surface 310 and the second surface 320. The patches 350 are arranged along folding creases of the umbrella canopy 300. Specifically, in the present embodiment, a plurality of patches 350 are fixed on the second surface 320, and the plurality of patches 350 are continuously circumferentially arranged along folding and bending portions of the umbrella ribs 200 and folding portions of the umbrella canopy 300. When the umbrella ribs 200 are folded, the umbrella canopy 300 can be directly folded along intervals between adjacent patches 350, thereby enabling quick rolling and folding, and facilitating the user to organize and fold the umbrella canopy 300 after each use. It can be understood that the patches 350 have a certain hardness, and the hardness of the patches 350 is higher than the hardness of the umbrella canopy 300. Since the umbrella canopy 300 needs to be wound and bent circumferentially after being folded, the patches 350 are bendable and deformable. Specifically, the patches 350 may be bendable sheets made of silicone, plastic, polypropylene, polyethylene, or the like.

Figure 9:
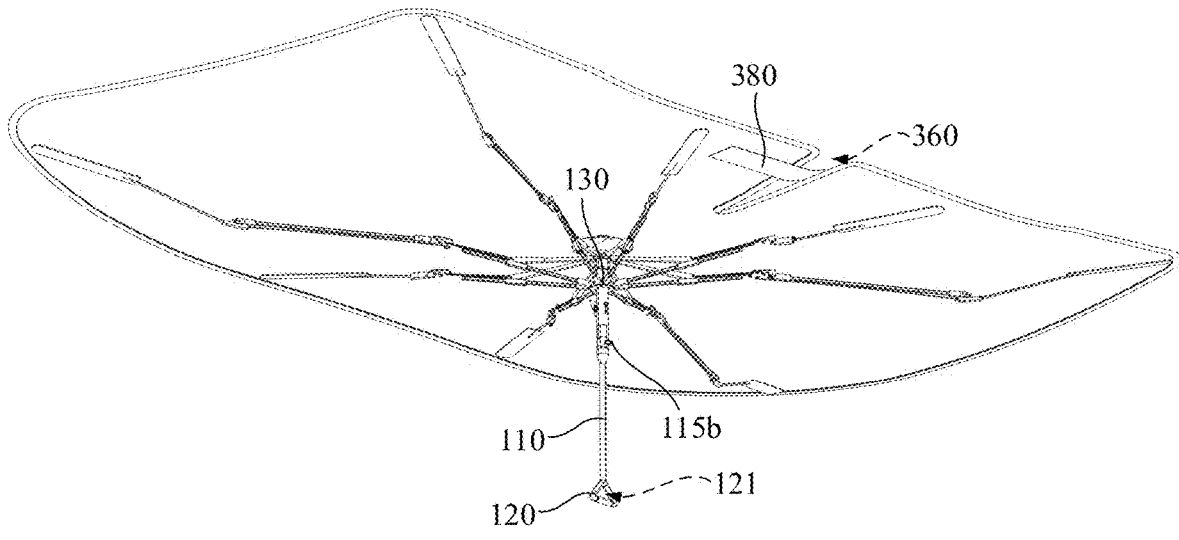
FIG. 9 is a schematic view of an overall structure of an in-vehicle sunshade umbrella according to a fifth embodiment of the present disclosure.

Further, with reference to FIG. 9, the edges of both the first surface 310 and the second surface 320 are provided with clearance notches 360. The clearance notch 360 on the first surface 310 and the clearance notch 360 on the second surface 320 are aligned with each other. The clearance notch 360 is used to clear an in-vehicle rearview mirror of the vehicle. Specifically, when the umbrella canopy 300 is opened, the first surface 310 is placed against the front windshield of the vehicle, and the clearance notches 360 are located at an upper edge of the umbrella canopy 300. At this time, the clearance notches 360 are aligned with the in-vehicle rearview mirror of the vehicle, such that the umbrella canopy 300 is not obstructed by the in-vehicle rearview mirror when placed against the front windshield, thereby facilitating installation and removal by the user.

Further, the clearance notches 360 are V-shaped, and opening widths of the clearance notches 360 gradually decrease in a direction from an edge toward a center of the umbrella canopy 300. It can be understood that the V-shaped clearance notches 360 not only clear the in-vehicle rearview mirror, but also maintain the integrity of the umbrella canopy 300 as much as possible, thereby reducing sunlight intrusion into the vehicle interior. The clearance notches 360 may be configured in other shapes, provided that they meet the usage requirements.

Further, with reference to FIG. 8, the umbrella canopy 300 also includes a closing member 370 fixed to edges of the clearance notches 360. The closing member 370 is configured to close the clearance notches 360. The closing member 370 is mounted on the edges of both sides of the clearance notches 360, so that the clearance notches 360 can be opened or closed as needed, thereby improving the usage flexibility of the umbrella canopy 300. Specifically, the user may adjust the opening width of the clearance notches 360 according to the position of the in-vehicle rearview mirror of the vehicle. Of course, the in-vehicle sunshade umbrella 10 may also be used as a rain umbrella, provided that the clearance notches 360 are fully closed by the closing member 370.

Further, the closing member 370 may be a zipper or a snap fastener. When the closing member 370 is a zipper, left and right portions of the zipper are respectively disposed on the edges of both sides of the clearance notches 360, and the zipper extends along an extending direction of the clearance notches 360 to close the clearance notches. When the closing member 370 is a snap fastener, the snap fastener includes a plurality of male snaps and a plurality of female snaps, which are respectively disposed on both sides of the clearance notches 360. The male snaps are engaged with the female snaps to close the two sides of the clearance notches 360. It can be understood that the closing member 370 may also be a Velcro fastener, magnetic sheets, or the like.

Further, with reference to FIG. 1, the umbrella canopy 300 further includes a tie strap 380. One end of the tie strap 380 is fixed to the first surface 310 or the second surface 320. Specifically, one end of the tie strap 380 may be fixed to the side of the first surface 310 adjacent to the second surface 320. The other end of the tie strap 380 extends out of the cavity 330. One end of the tie strap 380 is hidden within the cavity 330, thereby improving the overall aesthetics of the umbrella canopy 300. The tie strap 380 is configured to tie and secure the folded umbrella ribs 200 and umbrella canopy 300. After tying, the tie strap 380 may be positioned and locked by means of a Velcro fastener, magnetic sheets, buttons, or the like. In the present embodiment, the tie strap 380 is disposed at the position of the clearance notches 360. The tie strap 380 extends out of the cavity 330 through the clearance notches 360, such that the tie strap 380 can also be used to bind the in-vehicle rearview mirror, thereby improving the stability of the sunshade umbrella after installation. For example, the end of the tie strap 380 that extends out of the cavity 330 is provided with a Velcro hook surface, and the umbrella canopy 300 is provided, at the edges on the opposite side of the clearance notches 360, with a corresponding Velcro loop surface. When the umbrella canopy 300 is placed against the windshield and the clearance notches 360 clear the in-vehicle rearview mirror, the tie strap 380 can wrap around a rod portion of the in-vehicle rearview mirror and be attached to the corresponding Velcro loop surface on the umbrella canopy 300, thereby securing the sunshade umbrella relative to the in-vehicle rearview mirror and preventing the sunshade umbrella from accidentally detaching from the windshield, thus improving usage stability.

Further, with reference to FIG. 4, the umbrella ribs 200 include a plurality of long ribs 220 and a plurality of short ribs 230, the long ribs 220 extend from a center of the umbrella canopy 300 toward a long side of the umbrella canopy 300, the short ribs 230 extend from the center of the umbrella canopy 300 toward a short side of the umbrella canopy 300, each long rib 220 includes, in an extending direction, three long rods rotatably connected, and each short rib 230 includes, in an extending direction, two short rods rotatably connected. In the present embodiment, the three long rods rotatably connected in the extending direction of the long rib 220 are respectively a first long rod 221, a second long rod 222, and a third long rod 223. One end of the first long rod 221 is rotatably connected to the umbrella shaft 100 and slides along the umbrella shaft 100 to achieve folding. The other end of the first long rod 221 is rotatably connected to the second long rod 222, the other end of the second long rod 222 is rotatably connected to the third long rod 223, and the other end of the third long rod 223 is inserted into the corresponding supporting member 340 on the umbrella canopy 300. The long rib 220 further includes a fourth long rod 224 and long tension members 225. One end of the fourth long rod 224 is rotatably connected to an end portion of the umbrella shaft 100 adjacent to the umbrella canopy 300, and the other end of the fourth long rod 224 is connected between both ends of the first long rod 221. Two long tension members 225 are provided. The two long tension members 225 are respectively connected between the first long rod 221 and the fourth long rod 224, and between the first long rod 221 and the second long rod 222. The long tension members 225 are configured to provide rotational clastic force for the long rib 220 during folding.

The two short rods rotatably connected in the extending direction of the short rib 230 are a first short rod 231 and a second short rod 232. One end of the first short rod 231 is rotatably connected to the umbrella shaft 100 and slides along the umbrella shaft 100 to achieve folding, the other end of the first short rod 231 is rotatably connected to the second short rod 232, and the other end of the second short rod 232 is inserted into the corresponding supporting member 340 on the umbrella canopy 300. The short rib 230 further includes a third short rod 233 and a short tension member 234. One end of the third short rod 233 is rotatably connected to the end portion of the umbrella shaft 100 adjacent to the umbrella canopy 300, and the other end of the third short rod 233 is connected between both ends of the first short rod 231. Opposite ends of the short tension member 234 are respectively connected to the first short rod 231 and the third short rod 233. The short tension member 234 is configured to provide rotational elastic force for the short rib 230 during folding.

Further, with reference to FIG. 2 and FIG. 9, the umbrella shaft 100 includes a shaft body 110 and a handle 120 connected to each other. The shaft body 110 has a mounting end 111 and a handle end 112 opposite to each other. The mounting end 111 is connected to the umbrella canopy 300, and the handle end 112 is connected to the handle 120. The mounting end 111 of the shaft body 110 is configured to be mounted to the umbrella canopy 300, and the handle end 112 of the shaft body 110 is connected to the handle 120. The handle end 112 and the handle 120 may be integrally formed or threadedly connected. The handle 120 is configured for user gripping.

Further, with reference to FIG. 9, in one embodiment, the handle 120 is provided with a through hole 121, and the through hole 121 extends transversely through the handle 120. In the present embodiment, the through hole 121 in the handle 120 has a triangular shape, which facilitates finger gripping by the user. It can be understood that the through hole 121 may also have other shapes, such as circular, hexagonal, or the like. It should be noted that the handle 120 is configured for user gripping and may be provided without a through hole 121. For example, the handle 120 may have a cylindrical structure to better fit the palm of the user.

Further, with reference to FIG. 2 and FIG. 9, the shaft body 110 includes a bending member 115 disposed between the mounting end 111 and the handle end 112. The handle end 112 is rotated and bent relative to the mounting end 111 around the bending member 115. The bending member 115 enables the shaft body 110 to bend, thereby preventing obstruction caused by a vehicle dashboard panel to the umbrella shaft 100, which would otherwise make it impossible to open the umbrella.

Further, with reference to FIG. 2, the bending member 115 is a flexible tube 115a, and the flexible tube 115a is connected to the mounting end 111 and the handle end 112, respectively. Specifically, the flexible tube 115a is located between an upper section where the mounting end 111 is located and a lower section where the handle end 112 is located. The flexible tube 115a has the flexibility to bend in any direction. In this embodiment, the flexible tube 115a may be a metal hose 115a. One end of the flexible tube 115a is detachably connected to the upper section of the shaft body 110, and the other end of the flexible tube 115a is fixedly connected to the lower section of the shaft body 110. When the handle end 112 is swung, the flexible tube 115a bends accordingly, so that the handle end 112 does not collide with a steering wheel or dashboard inside the vehicle.

Further, with reference to FIG. 9, the bending member 115 is a hinge shaft 115b. The hinge shaft 115b passes through the upper section where the mounting end 111 is located and the lower section where the handle end 112 is located, allowing the mounting end 111 and the handle end 112 to rotate around the hinge shaft 115b. Specifically, a pivot slot is formed at an end of the upper section of the shaft body 110 adjacent to the lower section. A pivot protrusion is correspondingly provided on the lower section of the shaft body 110 and is engaged within the pivot slot. A hinge shaft 115b extends through both the upper section and the pivot protrusion of the shaft body 110, thereby allowing the upper and lower sections of the shaft body 110 to pivot about the hinge shaft 115b.

Figure 10:
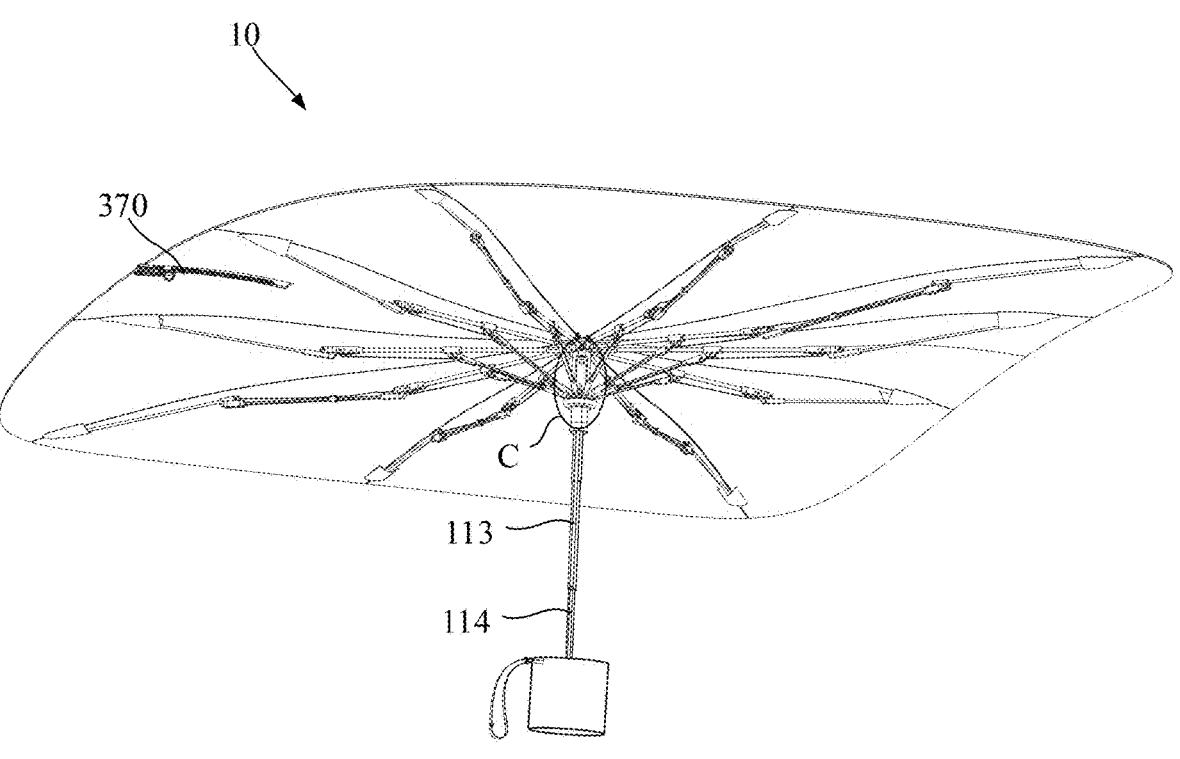
FIG. 10 is a schematic view of an overall structure of an in-vehicle sunshade umbrella according to a sixth embodiment of the present disclosure.

Further, with reference to FIG. 10, in one embodiment, the shaft body 110 includes a first telescopic rod 113 and a second telescopic rod 114. The first telescopic rod 113 is sleeved on the second telescopic rod 114, so that the first telescopic rod 113 and the second telescopic rod 114 slide telescopically relative to each other. It is understood that relative sliding and position limiting can be achieved between the first telescopic rod 113 and the second telescopic rod 114. The limiting structure is not particularly restricted and may include a metal clastic pin, etc. Correspondingly, the first telescopic rod 113 and the second telescopic rod 114 are provided with holes for insertion of the clastic pin. It should be noted that the telescopic shaft body 110 allows the user to adjust the length of the shaft body 110 as needed. For instance, when the in-vehicle dashboard is relatively high, the shaft body 110 may be retracted to avoid interference with the dashboard. The shaft body 110 of the in-vehicle sunshade umbrella 10 may also be extended for emergency use as a rain umbrella, thereby broadening the range of application. Additionally, the shaft body 110 may be provided with a plurality of telescopic rods, which is not particularly limited herein.

Figure 11:
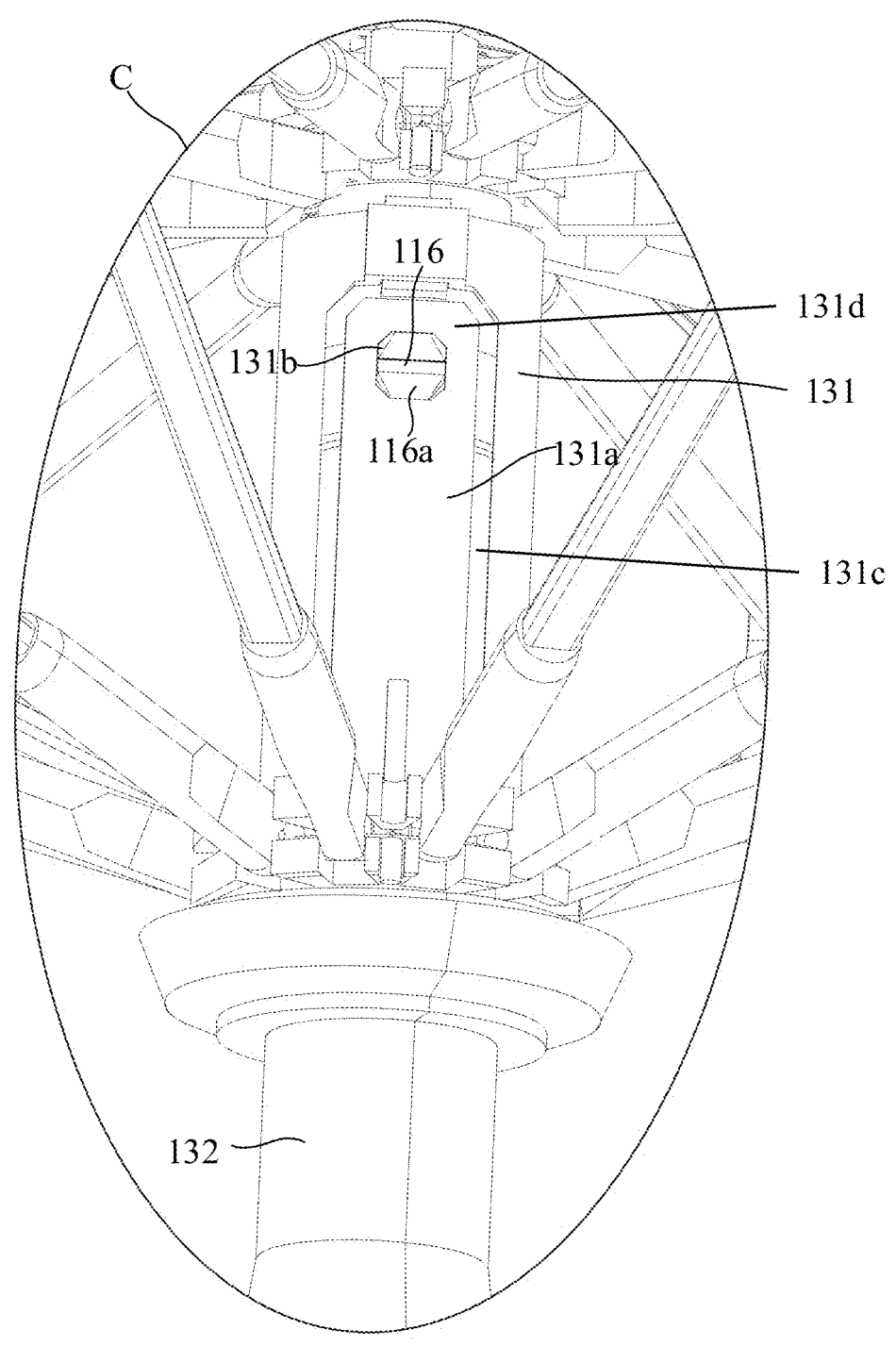
FIG. 11 is an enlarged structural view of region C in FIG. 10.
Figure 12:
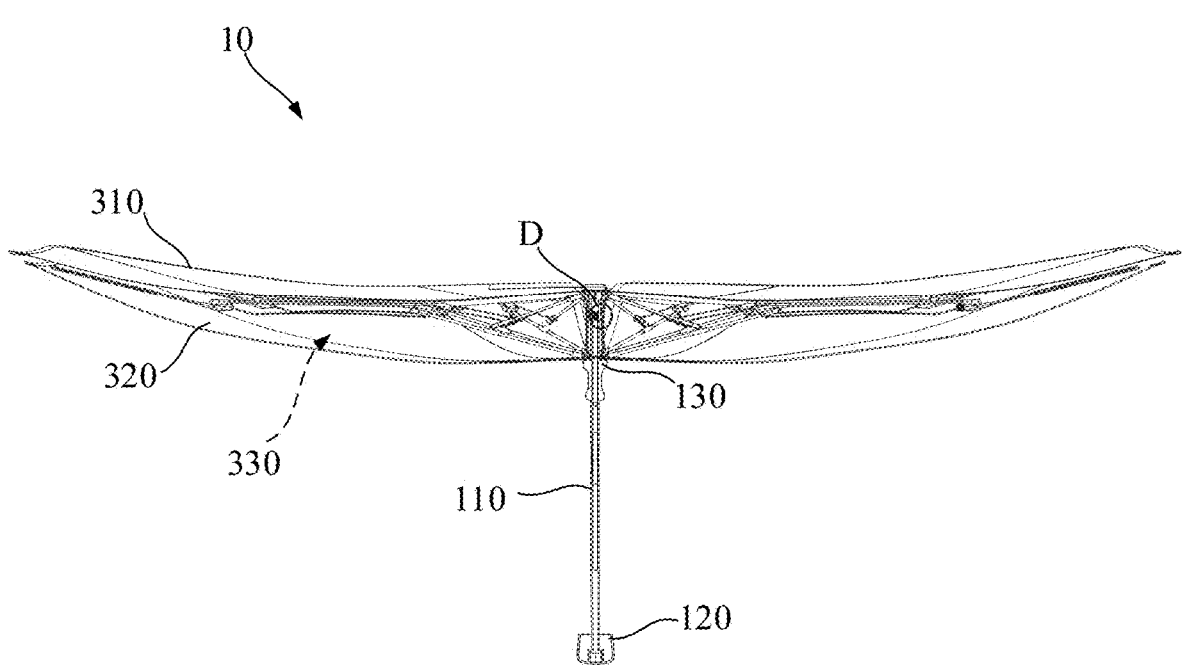
FIG. 12 is a schematic view of a cross-section structure of the in-vehicle sunshade umbrella according to the sixth embodiment of the present disclosure.
Figure 13:
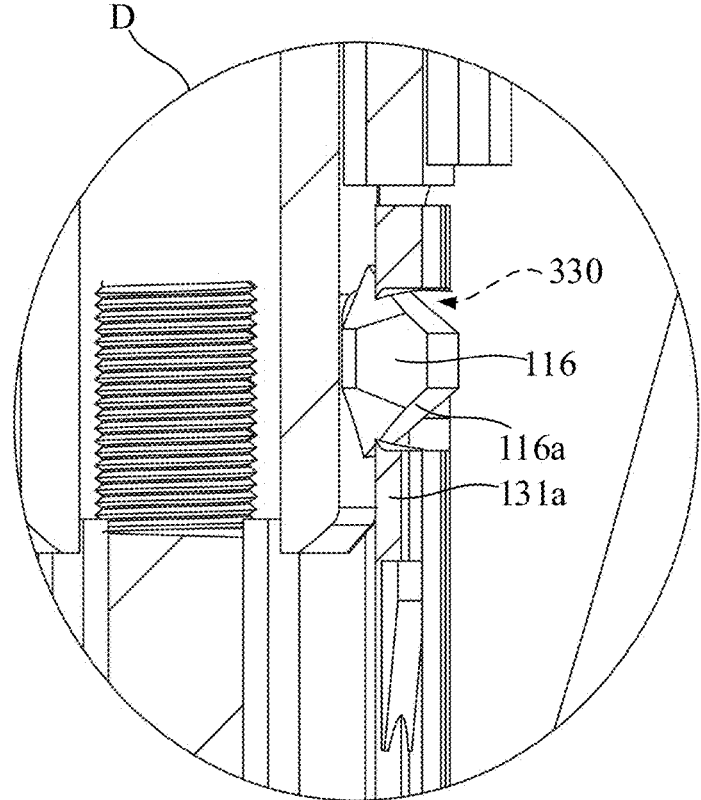
FIG. 13 is an enlarged structural view of region D in FIG. 12.

Further, with reference to FIG. 10 and FIG. 11, the umbrella shaft 100 further includes a locking structure 130 slidably sleeved around the shaft body 110. One end of each umbrella rib 200 is connected to the locking structure 130 and slides together with the locking structure 130. The shaft body 110 is provided with a stop block 116. By pushing or pulling the locking structure 130, the locking structure 130 and the stop block 116 may be switched between a locked state and an unlocked state. In the present embodiment, the locking structure 130 is sleeved around the shaft body 110. The first long rods 221 and the first short rods 231 of the umbrella ribs 200 are respectively pivotally connected to the locking structure 130. When the locking structure 130 slides along the shaft body 110, the umbrella ribs 200 are unfolded or folded accordingly. When the locking structure 130 is pushed upward, the locking structure 130 engages with the stop block 116 to achieve a locked state, thereby unfolding the umbrella ribs 200. When the umbrella ribs 200 need to be folded, the locking structure 130 is pulled downward and disengages from the stop block 116 under external force, thereby unlocking the locking structure 130 and the stop block 116. In the present embodiment, the locking and unlocking can be achieved by directly pushing and pulling the locking structure 130, which is more convenient compared with button-type sunshade umbrellas that require pressing to unlock before pulling for folding.

Furthermore, with reference to FIG. 11, the locking structure 130 includes a locking portion 131 and a push-pull portion 132 that are connected to each other. The locking portion 131 is provided with a locking tab 131a having a cantilevered end 131d, and a locking hole 131b is formed in the locking tab 131a for engagement with the stop block 116. Inclined surfaces 116a for pressing the locking tab 131a are provided at both ends of the stop block 116 along a sliding direction of the locking portion 131. The push-pull portion 132 is configured to be held for push-pull operation. In the present embodiment, the locking portion 131 is a cylindrical structure with a cavity 330, and an inverted-U-shaped through slot 131c is formed in a surface of the locking portion 131, thereby forming the locking tab 131a having the cantilevered end 131d. The locking hole 131b has a width and length equal to or slightly greater than those of the stop block 116. The inclined surfaces 116a are formed at the upper and lower ends of the stop block 116. When the user pushes the push-pull portion 132 upward, the locking portion 131 slides upward, and an upper end of the locking tab 131a abuts against the inclined surface 116a and slides along the inclined surface 116a, causing the locking tab 131a to be flexed outward and deform in a direction away from the center of the locking portion 131. As the push-pull portion 132 continues to be pushed upward, the locking tab 131a passes over the stop block 116 and recovers the original shape, allowing the stop block 116 to engage with the locking hole 131b, so that the umbrella ribs 200 are unfolded and locked. When the umbrella ribs 200 are to be folded, the push-pull portion 132 is pulled downward to cause the locking portion 131 to slide downward. The locking tab 131a is flexed outward again by the inclined surface 116a on the upper side and deforms in the direction away from the center of the locking portion 131. As the push-pull portion 132 continues to be pulled downward, the locking tab 131a passes over the stop block 116 and recovers the original shape, allowing the stop block 116 to disengage from the locking hole 131*b*, so that the umbrella ribs 200 are folded.

It should be noted that, to prevent the stop block 116 from unintentionally disengaging from the locking hole 131*b*, a blocking surface connected to the inclined surface 116*a* may be provided at the upper end of the stop block 116. When the stop block 116 is fully engaged in the locking hole 131*b*, the blocking surface at the upper end of the stop block 116 abuts against an upper sidewall of the locking hole 131*b*, thereby preventing the locking portion 131 from unintentionally sliding downward and causing the stop block 116 to disengage from the locking hole 131*b*. It can be understood that a width of the blocking surface of the stop block 116 does not exceed a thickness of the locking tab 131*a*, so as to allow the push-pull portion 132 to be pulled downward without obstruction.

Figure 14:
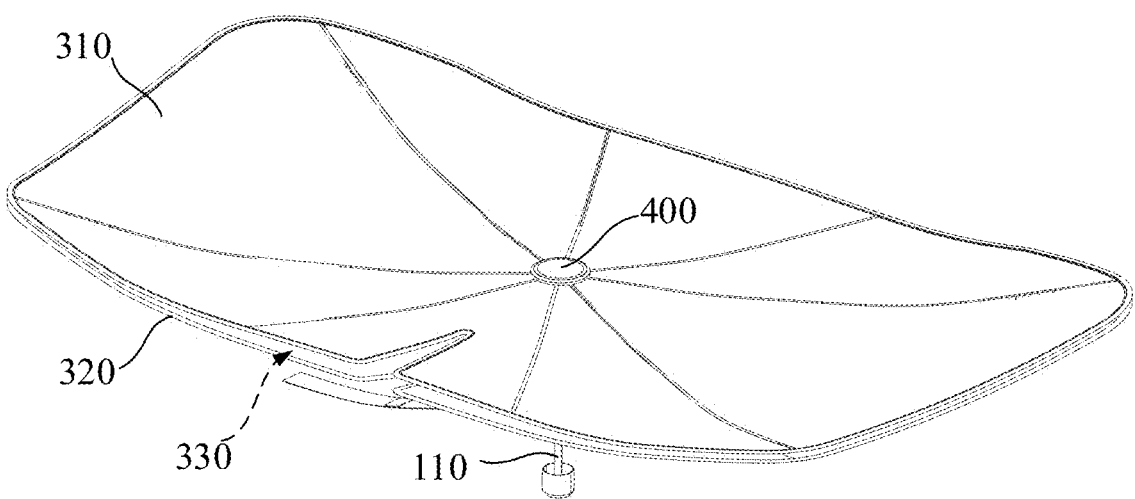
FIG. 14 is a schematic view of an overall structure of an in-vehicle sunshade umbrella according to a seventh embodiment of the present disclosure.
Figure 15:
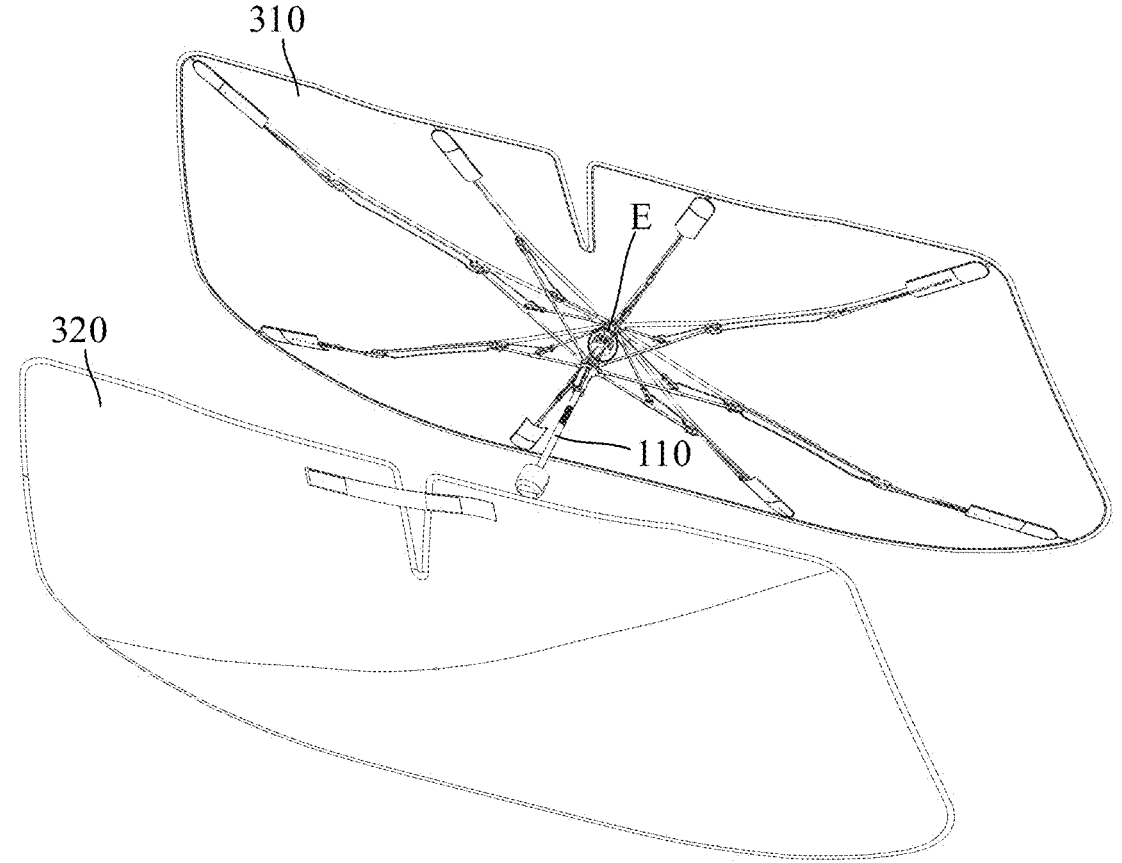
FIG. 15 is an exploded schematic structural view of the in-vehicle sunshade umbrella as shown in FIG. 14.
Figure 16:
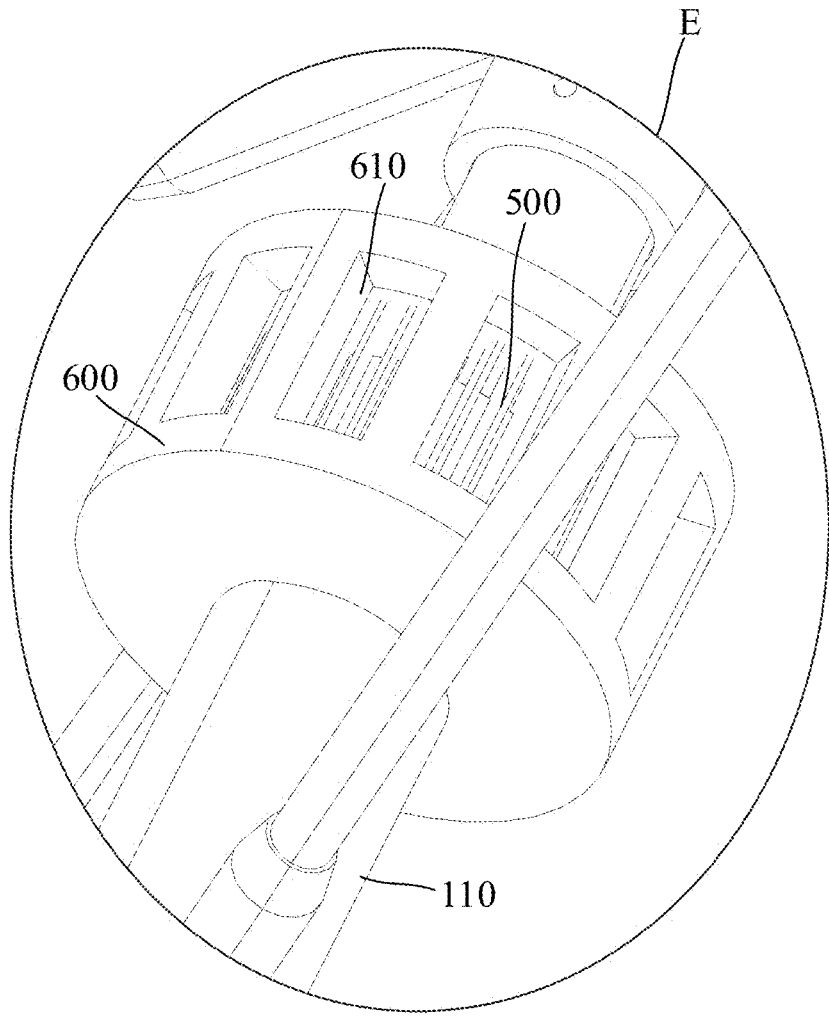
FIG. 16 is an enlarged structural view of region E in FIG. 15.

Further, with reference to FIG. 14 to FIG. 16, the in-vehicle sunshade umbrella 10 further includes a solar panel 400 and a heat dissipation member 500. The solar panel 400 is fixed to the side of the first surface 310 facing away from the second surface 320. The solar panel 400 is electrically connected to and supplies power to the heat dissipation member 500. The heat dissipation member 500 is fixed within the cavity 330 and configured to dissipate heat from the cavity 330. The heat dissipation member 500 may be a fan. In the present embodiment, the solar panel 400 is fixed to a side of the umbrella canopy 300 facing the outside of the vehicle, so that the solar panel 400 can receive light for power generation. Specifically, the solar panel 400 is aligned with the mounting end 111 of the shaft body 110, i.e., the solar panel 400 is aligned with the central position of the first surface 310, so as to avoid interfering with the folding of the umbrella canopy 300. The heat dissipation member 500 is mounted on the shaft body 110 and located within the cavity 330. Powered by the solar panel 400, the heat dissipation member 500 is activated to expel air from the cavity 330, thereby effectively dissipating heat from the dual-layer umbrella canopy 300.

In the present embodiment, the heat dissipation member 500 is a fan. A housing 600 is further disposed around an outer periphery of the shaft body 110. The heat dissipation member 500 is mounted within the housing 600. The housing 600 is provided with an air duct 610 through which airflow from the heat dissipation member 500 passes, thereby generating airflow circumferentially around the shaft body 110. It can be understood that the fan may include fan blades, a motor, a circuit board, etc. In other embodiments, the heat dissipation member 500 may further be provided with a built-in power storage unit to store surplus power generated by the solar panel 400.

Figure 17:
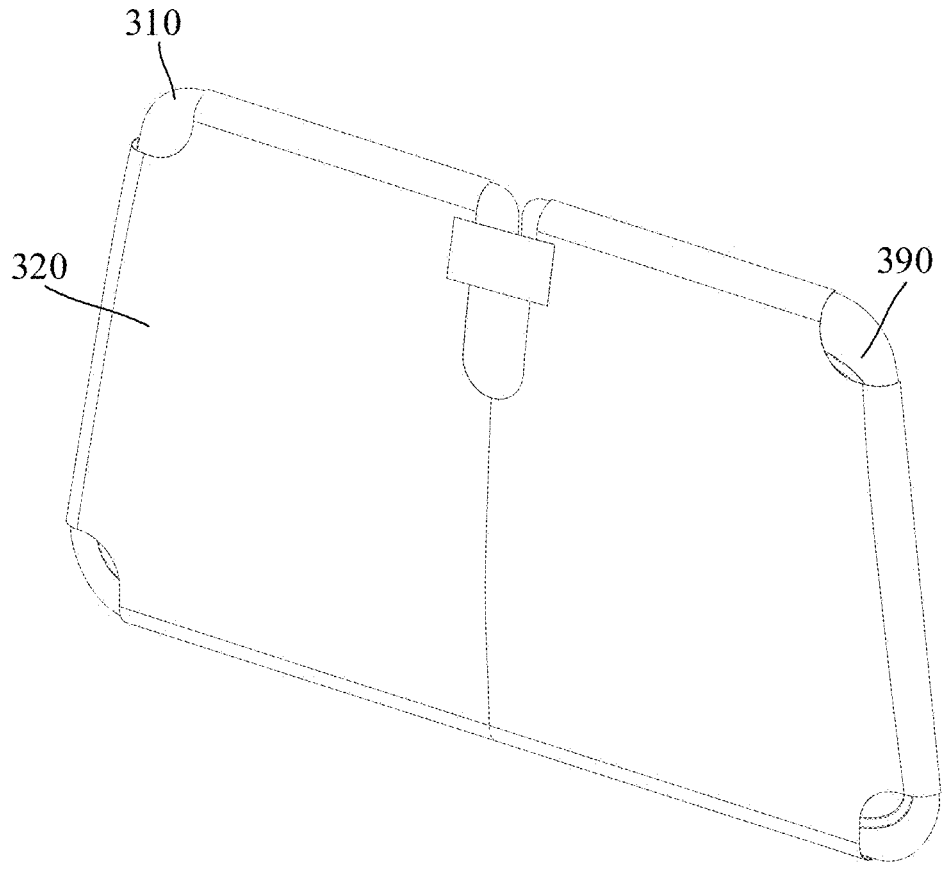
FIG. 17 is a schematic view of an overall structure of an in-vehicle sunshade umbrella according to an eighth embodiment of the present disclosure.
Figure 18:
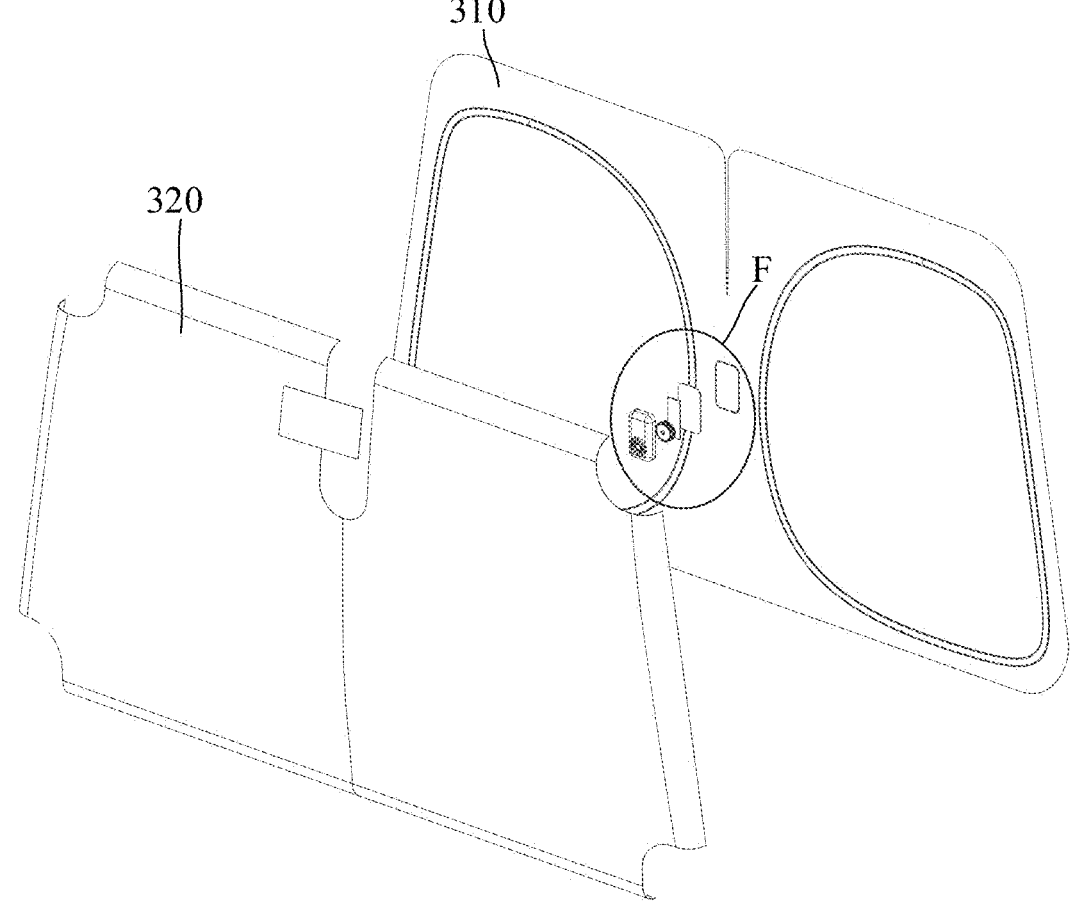
FIG. 18 is an exploded schematic structural view of the in-vehicle sunshade umbrella as shown in FIG. 17.
Figure 19:
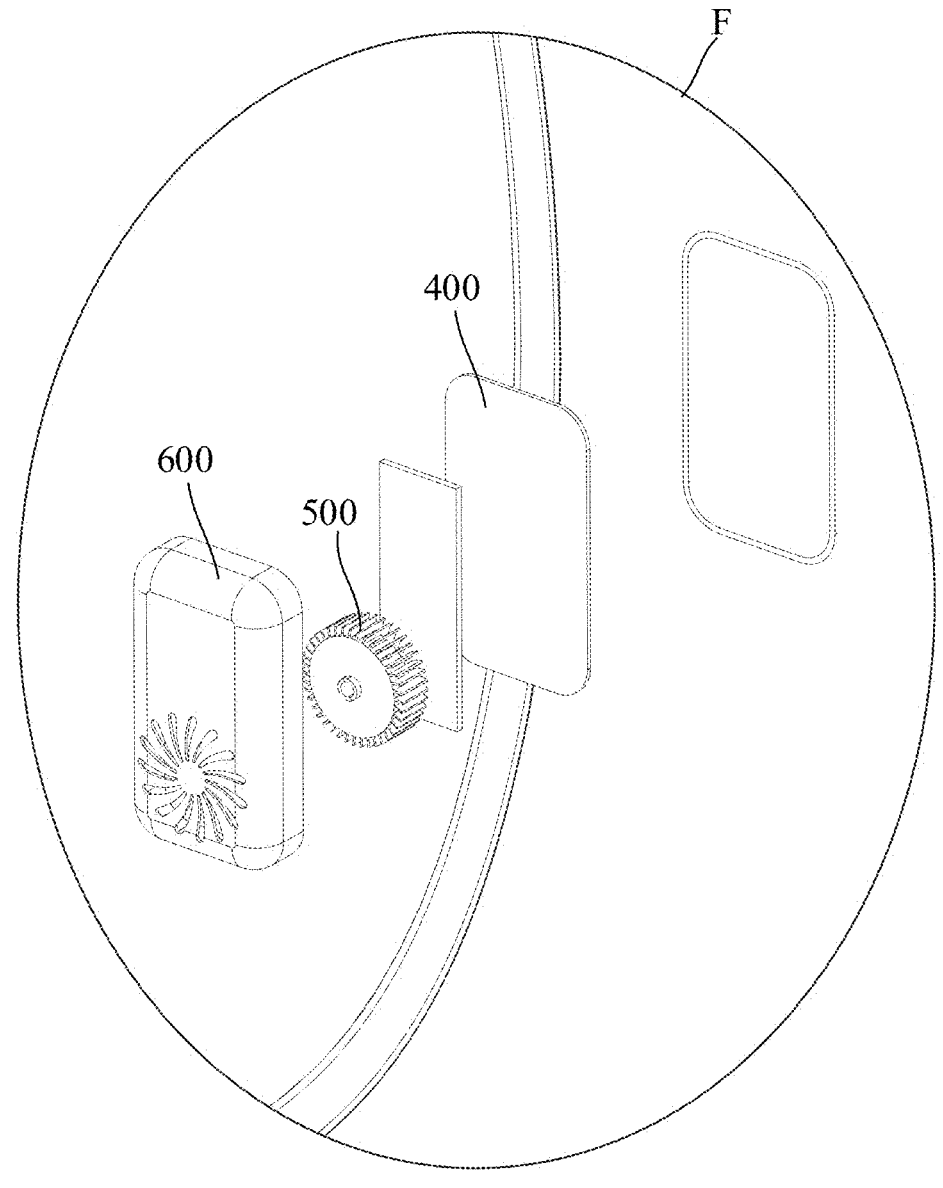
FIG. 19 is an enlarged structural view of region F in FIG. 18. Descriptions of the reference signs are as follows.

With reference to FIG. 17 to FIG. 19, in the eighth embodiment, the in-vehicle sunshade umbrella 10 may be configured without the umbrella shaft 100 and the umbrella ribs 200. In the present embodiment, fixing strips are provided between the first surface 310 and the second surface 320 to support the umbrella canopy 300, thereby ensuring that the umbrella canopy 300 does not collapse during use. In the present embodiment, the housing 600 having one end extending into the cavity 330 is fixed to the first surface 310. The solar panel 400 is fixed to the housing 600 and located on the side of the first surface 310 facing away from the second surface 320. The heat dissipation member 500 is mounted within the housing 600 and electrically connected to the solar panel 400. The heat dissipation member 500 may be a fan. The side of the housing 600 extending into the cavity 330 is provided with the air duct 610 for the heat dissipation member 500 to direct airflow. When the heat dissipation member 500 is activated, the airflow generated by the heat dissipation member 500 is directed through the air duct 610 into the cavity 330, thereby promoting air circulation within the cavity 330 to achieve heat dissipation for the dual-layer umbrella canopy 300. As in the above-mentioned embodiments, the fan may include fan blades, a motor, a circuit board, etc. The heat dissipation member 500 may further be provided with a built-in power storage unit to store surplus power generated by the solar panel 400.

It should be noted that the heat dissipation notches 390 are also formed at the corners of the umbrella canopy 300. The heat dissipation notches 390 communicate the cavity 330 with an external space, thereby improving the smoothness and rate of air circulation within the cavity 330 and enhancing the heat dissipation effect of the umbrella canopy 300.

Although the present disclosure has been described with reference to several typical embodiments, it should be understood that the terms used are illustrative and exemplary, rather than limited. Since the present disclosure can be embodied in various forms without departing from the spirit or essence of the present disclosure, it should be understood that the above embodiments are not limited to the specific details mentioned and should be broadly interpreted within the spirit and scope defined by the appended claims. Therefore, all variations and modifications that fall within the scope of the claims or their equivalents should be covered by the appended claims.

What is claimed is:

1. An in-vehicle sunshade umbrella, comprising:

an umbrella shaft;

umbrella ribs connected to the umbrella shaft, wherein the umbrella ribs slide along the umbrella shaft to fold or unfold; and an umbrella canopy comprising a first surface and a second surface opposite to each other, wherein at least one of the first surface and the second surface is connected to the umbrella ribs, a cavity is formed between the first surface and the second surface, and the first surface and the second surface are folded or unfolded synchronously with the umbrella ribs;

wherein the umbrella shaft comprises a locking structure slidably sleeved on the shaft body, one end of each of the umbrella ribs is connected to the locking structure and slides along with the locking structure, the shaft body is provided with a stop block, and by pushing and pulling the locking structure, the locking structure and the stop block are switched between a locked state and an unlocked state;

wherein the locking structure comprises a locking portion and a push-pull portion connected to each other, the locking portion is provided with a locking tab having a cantilevered end, a locking hole is formed in the locking tab for the engagement of the stop block, inclined surfaces for pressing the locking tab are provided at both ends of the stop block along a sliding direction of the locking portion, the cantilevered end of the locking tab is deformable, such that the locking tab is capable of passing over the stop block and recovering to an original shape, thereby allowing the stop block to engage with the locking hole; and the push-pull portion is configured to be held for push-pull operation;

wherein an inverted-U-shaped through slot is formed in a surface of the locking portion, thereby forming the locking tab having the cantilevered end.

2. An in-vehicle sunshade umbrella comprising an umbrella shaft;

umbrella ribs connected to the umbrella shaft, wherein the umbrella ribs slide along the umbrella shaft to fold or unfold; and an umbrella canopy comprising a first surface and a second surface opposite to each other, wherein at least one of the first surface and the second surface is connected to the umbrella ribs, a cavity is formed between the first surface and the second surface, and the first surface and the second surface are folded or unfolded synchronously with the umbrella ribs;

wherein the in-vehicle sunshade umbrella further comprises a solar panel and a heat dissipation member, wherein the solar panel is fixed on a side of the first surface facing away from the second surface, the solar panel is electrically connected to the heat dissipation member and supplies power thereto, and the heat dissipation member is fixed in the cavity and arranged to surround the umbrella shaft; and the heat dissipation member is configured to dissipate heat in the cavity.

3. The in-vehicle sunshade umbrella according to claim 2, wherein a housing is further disposed around an outer periphery of the shaft body; the heat dissipation member is mounted within the housing; the housing is provided with an air duct through which airflow from the heat dissipation member passes, thereby generating airflow circumferentially around the shaft body.

4. The in-vehicle sunshade umbrella according to claim 2, wherein patches are fixed to at least one of the first surface and the second surface, and the patches are circumferentially arranged along folding and bending portions of the umbrella ribs and folding portions of the umbrella canopy.

5. The in-vehicle sunshade umbrella according to claim 4, wherein the umbrella ribs are clamped in the cavity between the first surface and the second surface.

6. The in-vehicle sunshade umbrella according to claim 5, wherein edges of the first surface and the second surface are fixedly connected in a non-detachable manner.

7. The in-vehicle sunshade umbrella according to claim 5, wherein the umbrella canopy also comprises a first connecting member and a second connecting member that are detachably connected, the first connecting member is fixed to the first surface, and the second connecting member is fixed to the second surface.

8. The in-vehicle sunshade umbrella according to claim 4, wherein a plurality of supporting members are fixedly provided on a side of the first surface adjacent to the second surface, a supporting hole is formed in each of the supporting members, and end portions of the umbrella ribs are inserted into the corresponding supporting holes.

9. The in-vehicle sunshade umbrella according to claim 8, wherein the end portions of the umbrella ribs are also provided with elastic members equal in number to the supporting members, the elastic members are sleeved on the end portions of the corresponding umbrella ribs, one end of each of the elastic members is fixed relative to the corresponding umbrella rib, and the other end of the elastic member is inserted into the supporting hole along with the end portion of the corresponding umbrella rib.

10. The in-vehicle sunshade umbrella according to claim 8, wherein the supporting members are silicone sheets or rubber sheets, and the supporting holes are formed in the supporting members.

11. The in-vehicle sunshade umbrella according to claim 4, wherein clearance notches are formed in edges of the first surface and the second surface; the clearance notches are V-shaped, and opening widths of the clearance notches gradually decrease in a direction from an edge toward a center of the umbrella canopy.

12. The in-vehicle sunshade umbrella according to claim 11, wherein the umbrella canopy also comprises a closing member fixed to edges of the clearance notches, and the closing member is configured to close the clearance notches.

13. The in-vehicle sunshade umbrella according to claim 4, wherein the umbrella canopy also comprises a tie strap, and one end of the tie strap is fixed to the first surface or the second surface.

14. The in-vehicle sunshade umbrella according to claim 4, wherein the umbrella ribs comprise a plurality of first ribs and a plurality of second ribs, the first ribs extend in a direction from a center of the umbrella canopy toward a first side of the umbrella canopy, the second ribs extend in a direction from the center of the umbrella canopy toward a second side of the umbrella canopy, each of the first ribs comprises, in an extending direction, three rods rotatably connected, and each second rib comprises, in an extending direction, two rods rotatably connected.

15. The in-vehicle sunshade umbrella according to claim 4, wherein the umbrella shaft comprises a shaft body and a handle connected to each other, the shaft body has a mounting end and a handle end opposite to each other, the mounting end is connected to the umbrella canopy, and the handle end is connected to the handle.

16. The in-vehicle sunshade umbrella according to claim 15, wherein a through hole is formed in the handle and extends transversely through the handle.

17. The in-vehicle sunshade umbrella according to claim 15, wherein the shaft body comprises a first telescopic rod and a second telescopic rod, and the first telescopic rod is sleeved on the second telescopic rod, so that the first telescopic rod slides telescopically relative to the second telescopic rod.

18. The in-vehicle sunshade umbrella according to claim 15, wherein the shaft body comprises a bending member disposed between the mounting end and the handle end, and the handle end is rotatably bent relative to the mounting end around the bending member.

19. The in-vehicle sunshade umbrella according to claim 18, wherein the bending member is a flexible tube, and the flexible tube is connected to the mounting end and the handle end, respectively.

20. The in-vehicle sunshade umbrella according to claim 18, wherein the bending member is a hinge shaft, and the hinge shaft extends through an upper section where the mounting end is located and a lower section where the handle end is located, respectively, so that the mounting end and the handle end rotate around the hinge shaft.

21. The in-vehicle sunshade umbrella according to claim 18, wherein the umbrella shaft also comprises a locking structure slidably sleeved on the shaft body, one end of each of the umbrella ribs is connected to the locking structure and slides along with the locking structure, the shaft body is provided with a stop block, and by pushing and pulling the locking structure, the locking structure and the stop block are switched between a locked state and an unlocked state.

* * * * *